US007502162B2

(12) United States Patent
Lin et al.

(10) Patent No.: US 7,502,162 B2
(45) Date of Patent: Mar. 10, 2009

(54) CORE-SHELL PARTICLES CONTAINING FLUORESCENT COMPONENTS FOR ELECTROPHORETIC DISPLAYS

(75) Inventors: Pinyen Lin, Rochester, NY (US); Naveen Chopra, Oakville, CA (US); David H. Pan, Rochester, NY (US); Peter M. Kazmaier, Mississauga, CA (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 11/753,775

(22) Filed: May 25, 2007

(65) Prior Publication Data

US 2008/0291526 A1 Nov. 27, 2008

(51) Int. Cl.
*G02B 26/00* (2006.01)
*G09G 3/34* (2006.01)

(52) U.S. Cl. ....................................... 359/296; 345/107

(58) Field of Classification Search ................. 359/296; 345/107; 430/32; 204/600
See application file for complete search history.

(56) References Cited

U.S. PATENT DOCUMENTS 3,668,106 A 6/1972 Ota
4,338,390 A 7/1982 Lu
5,554,480 A 9/1996 Patel et al.
6,017,584 A 1/2000 Albert et al.
6,525,866 B1 2/2003 Lin et al.
6,529,313 B1 3/2003 Lin et al.
6,577,433 B1 6/2003 Lin et al.
7,123,238 B2 10/2006 Lin et al.
7,382,514 B2 * 6/2008 Hsu et al. .................. 359/290
2006/0245038 A1 11/2006 Albert et al.
2007/0201124 A1 * 8/2007 Whitesides et al. ......... 359/296

OTHER PUBLICATIONS

U.S. Appl. No. 11/419,440, filed May 19, 2006.

* cited by examiner

*Primary Examiner*—William C Choi
(74) *Attorney, Agent, or Firm*—Oliff & Berridge, PLC

(57) ABSTRACT

An electrophoretic ink includes fluid having either (a) at least two sets of differently colored particles with the fluid been a substantially clear fluid, or (b) at least one set of colored particles with the fluid been a differently colored fluid than the colored particles, wherein at least one set of colored particles includes at least one electrophoretic particle having a core-shell structure. The at least one electrophoretic particle includes a shell and a core located within the shell, wherein the core includes a colorant and a fluorescent compound. An electric field may be applied adjacently to the fluid of the ink, and the at least one set of colored particles having the core-shell structure is movable within the fluid of the ink by the electric field.

24 Claims, 6 Drawing Sheets

18 16 20 22a 22b 24 26 28 12 14 10 20 16 18

CORE-SHELL PARTICLES CONTAINING FLUORESCENT COMPONENTS FOR ELECTROPHORETIC DISPLAYS

Described are systems and methods for forming core-shell particles containing fluorescent materials, and to inclusion of such core-shell particles as colorants in a fluorescent electrophoretic ink of a display device. The core-shell particles may be suspended in the ink, and the ink may be used in an electrophoretic display device, for example within microcapsules distributed in a display layer of the display device. The shell of each core-shell particle may comprise a polymer that may be clear and/or may provide mechanical strength and/or thermal strength for the particles. A surface of each shell of the core-shell particles may be electrostatically charged within the ink. The core of the particles may comprise one or more color pigments, resin binder and the fluorescent components.

The electrophoretic inks described herein find utility in any electrophoretic display application, and particularly any display application where the image displayed may be changed, including, for example, reimageable paper, electronic books, electronic signage, watch, monitor and/or cell phone displays, and the like.

Advantages associated with the use of core-shell particles including fluorescent compounds include that the fluorescent components of the core-shell particles may prevent scattering or absorbing of light by the display device having the electrophoretic ink. The fluorescent components may increase light reflected outward from the display device towards a viewer or the like. In embodiments, the fluorescent components may absorb ultraviolet light and emit light at a wavelength of a display color for the display device. Light emitted at the wavelength of the display color may increase a perceived color intensity or a color contrast that may be viewable by a viewer of the display device.

REFERENCES

U.S. Pat. No. 7,123,238, incorporated herein by reference in its entirety, illustrates an electrophoretic display device that includes a spacer layer positioned between two conductive film substrates. The spacer layer defines a multiplicity of individual reservoirs within the display device that are filled with a display liquid. The spacer layer preferably is one of a screen in which holes within the screen define the individual reservoirs, a laser punched spacer layer comprised of a sheet having holes laser punched therein in which the laser punched holes define the individual reservoirs, a pocket spacer layer comprised of sheets joined together and containing a pattern of pockets within the sheets in which the pockets define the individual reservoirs, an etched photo-resistant layer formed upon one of the conductive film substrates in which holes etched in the photo-resistant layer define the individual reservoirs, and a composite etched layer comprised of a composite of two photo-resistant layers sandwiching a conductive film in which holes etched in the composite define the individual reservoirs.

U.S. Pat. No. 6,577,433, incorporated herein by reference in its entirety, illustrates an electrophoretic display liquid composition for use in an electrophoretic display device that has a multiplicity of individual reservoirs. Each of the multiplicity of individual reservoirs may contain the display liquid of two sets of particles dispersed in a transparent liquid system as well as at least one charge director dissolved or dispersed in the liquid system, or physically embedded on the surface of the particles or chemically bonded on the surface of the particles. The two sets of particles exhibiting different, contrasting color and different charging properties from each other.

U.S. Pat. No. 6,525,866, incorporated herein by reference in its entirety, discloses an electrophoretic display liquid composition for use in an electrophoretic display device that has a multiplicity of individual reservoirs each containing the display liquid of at least two sets of particles dispersed in a transparent liquid system, the at least two sets of particles exhibiting different, contrasting color and different charging properties from each other, and at least one of the sets of particles containing flow aid particles as additives upon an external surface of the particles. Preferred flow aid additives include silica and titania particles.

U.S. Pat. No. 5,554,480 incorporated herein by reference in its entirety, illustrates a process for the preparation of fluorescent toner compositions. The process includes preparing a pigment dispersion in a solvent, which dispersion is comprised of a pigment or dye, an ionic surfactant and optionally a charge control agent. Further, the process includes shearing the pigment dispersion with a latex mixture comprised of a counterionic surfactant with a charge polarity of opposite sign to that of said ionic surfactant, a nonionic surfactant and resin particles, thereby causing a flocculation or heterocoagulation of pigment, resin particles and charge control agent to form electrostatically bound toner size aggregates. Moreover, the process includes heating the statically bound aggregated particles to form said toner composition comprised of polymeric resin, pigment and optionally a charge control agent. The pigment or dye is excitable by ultraviolet light in the frequency range of from about 254 to about 366 nanometers and fluoresces in the visible spectrum of from about 400 to about 700 nanometers.

BACKGROUND

An electronic paper display may be formed by connecting a thin layer of transparent plastic small beads, which are randomly dispersed, to a surface of a sheet. The beads have two hemispheres that have two contrasting colors, such as black and white, red and white or the like. The hemispheres are electrically charged to exhibit an electrical dipole. For example, the color red on a first hemisphere may be associated with a negative charge and the color white on a second hemisphere may be associated with a positive charge. The hemispheres of the beads are contained within an oil-filled cavity, and rotate within the oil-filled cavities based on electrical charges that attract or repel the electrically charged hemispheres. Thus, the sheet receiving the beads and/or the oil-filled cavities may be required to be stiff and rigid to prevent puncturing of the cavities or damaging of the cavities or the hemispheres of the beads by, for example crushing, flattening or the like.

A voltage is applied to the surface of the sheet via one or more electrode plates associated with the sheet. The voltage applied by the electrode plates provides an electric field which may attract one of the hemispheres of one or more of the beads based on the charge associated with that hemisphere. As a result, one or more of the beads are rotated by the attractive forces between one of the hemispheres of the beads, the charge associated with the hemispheres of the beads, and the electric field created by the electrode plates. As a result, the hemispheres of the beads may rotate to present one of the hemispheres in a viewing direction on the electronic paper. By rotating one or more beads to present one of the hemispheres for each bead, the hemispheres may form or may display an image on the electronic paper. As a result, the electric field applied to the surface of the sheet by the electrode plates creates the image that is viewable from a viewing direction of the electronic paper.

However, connecting a thin layer of the beads having the oil-filled cavities to the surface of the sheet to form the electronic paper is often time consuming and costly. Additionally, a resolution of the images formed on the surface of the electronic paper by the one or more beads tends to be lower because a pixel count per square inch for the thin layer of beads formed on the surface of the sheet is often minimal as compared to a resolution of a conventional display, such as an LCD. Further, increasing the pixels per square inch by increasing a number of beads per square inch on the surface of the sheet is burdensome because difficulties exist for positioning the oil-filled cavities at specific locations corresponding to specific pixels or subpixels. Moreover, sealing an increased number of oil-filled cavities to the surface of the sheet to increase the pixels per square inch is inconvenient for forming electronic paper via the beads. The rotation of the beads to display different hemispheres often tends to be too slow for some display purposes, such as screens and the like. As a result, forming electronic paper with the beads having oil-filled cavity has an increased probability for manufacturing problems and often elevates production costs for the electronic paper.

Furthermore, dyes or colored pigments that are traditionally used to provide color in electrophoretic inks scatter or absorb a portion of ambient light. As a result, a lower percentage of light reflects back towards or comes back towards a viewer because of the portion of ambient light scattered or absorbed by the dyes or colored pigments. A color intensity is thus low in the color contrast display. More specifically, the color contrast between white areas, such as background areas, and color areas, such as image areas, is poor compared to the same color contrast in other backlit displays or light emitting displays. Further, the dyes or colored pigments may absorb ultraviolet (UV) light that results in degraded appearance over time.

A need, therefore, exists for a system and a method for forming better color contrast electrophoretic displays with enhanced color intensity. Further, a need exists for a system and a method for forming electrophoretic ink that reduces scattering or absorption of ambient light. Still further, a need exists for a system and a method for a forming electrophoretic ink that reflects a high percentage of light back towards a viewer of a display device having the electrophoretic ink. Furthermore, a need exists for a system and a method for forming electrophoretic ink that may prevent UV light absorption by colored pigments to reduce degradation of appearance over time.

SUMMARY

Described herein is a system and a method for forming fluorescent electrophoretic ink having core-shell particles that may contain fluorescent components. The inks may be positioned within one or more reservoirs on a substrate to form an electrophoretic display. In embodiments, the reservoirs may include microcapsules that each comprise a shell having the inks located therein.

The fluorescent components are within core-shell particles that include a shell and a core having color pigments, resin binder and the fluorescent components. The shell of the core-shell particles may be electrostatically charged within the ink to form fluorescent electrophoretic ink. The shell of the core-shell particles may also provide mechanical strength and/or thermal strength for the core-shell particles. The fluorescent components may absorb UV light and/or may emit light at the wavelength of a display color to increase a perceived color intensity displayed by a display device having the fluorescent electrophoretic ink. As a result, a color contrast between white portions and colored portions may be increased by the increased perceived color intensity caused by the fluorescent components. The fluorescent components may absorb UV light and visible light to provide fluorescence for use of the display device during daylight or within indoor conditions.

According to aspects illustrated herein, there is provided an electrophoretic ink comprising either (a) at least two sets of differently colored particles in a substantially clear fluid, or (b) at least one set of colored particles in a fluid that is of a different color than the at least one set of colored particles, wherein at least one set of colored particles comprises particles having a core-shell structure. The core-shell structure has a shell and a core located within the shell, wherein the core comprises a colorant and a fluorescent compound. The at least one set of colored particles has the core-shell structure that is movable within the fluid by an electric field.

In embodiments, provided is an electrophoretic display device comprising a display layer comprised of reservoirs, wherein a multiplicity of the reservoirs are filled with an electrophoretic ink comprising either (a) at least two sets of differently colored particles in a substantially clear fluid, or (b) at least one set of colored particles in a fluid that is of a different color than the at least one set of colored particles. The at least one set of colored particles includes particles having a core-shell structure that includes a fluorescent compound, wherein the at least one set of colored particles having the core-shell structure are movable in the fluid within the reservoir by an electric field.

In other embodiments, provided is a method of displaying images, the method comprising, in a display device having a display layer including at least two reservoirs, wherein the at least two reservoirs are filled with an electrophoretic ink that is comprised either (a) at least two sets of differently colored particles in a substantially clear fluid, or (b) at least one set of colored particles in a fluid that is of a different color than the at least one set of colored particles. The at least one set of colored particles includes at least one electrophoretic particle having a core-shell structure that includes a fluorescent compound within the core of the electrophoretic particle, applying an electric field to selected ones of the reservoirs so as to move a desired set of particles therein to be viewed by a viewer, wherein individual reservoirs are thus made to display a desired color and form an image in the display layer.

Advantages of the various embodiments described herein include to provide a system and a method for forming fluorescent electrophoretic ink which may increase an amount of light reflected towards a viewer of a display device having the ink. Another advantage of the various embodiments is to provide a system and a method for forming fluorescent electrophoretic ink which may absorb UV light and emit light at a wavelength of a display color to increase a perceived color intensity for the display color by a display device having the fluorescent electrophoretic ink. Moreover, another advantage of the various embodiments is to provide a system and a method for forming fluorescent electrophoretic ink which may increase a color contrast between white portions and colored portions displayed by a display device having the fluorescent electrophoretic ink. Yet another advantage of the various embodiments is to provide a system and a method for forming fluorescent electrophoretic ink which may have colored pigments that avoid UV light absorption and fluorescent components that may not decay over time.

Additional features and advantages of the various embodiments are described herein and/or will be apparent from the description.

EMBODIMENTS

Figure 1:
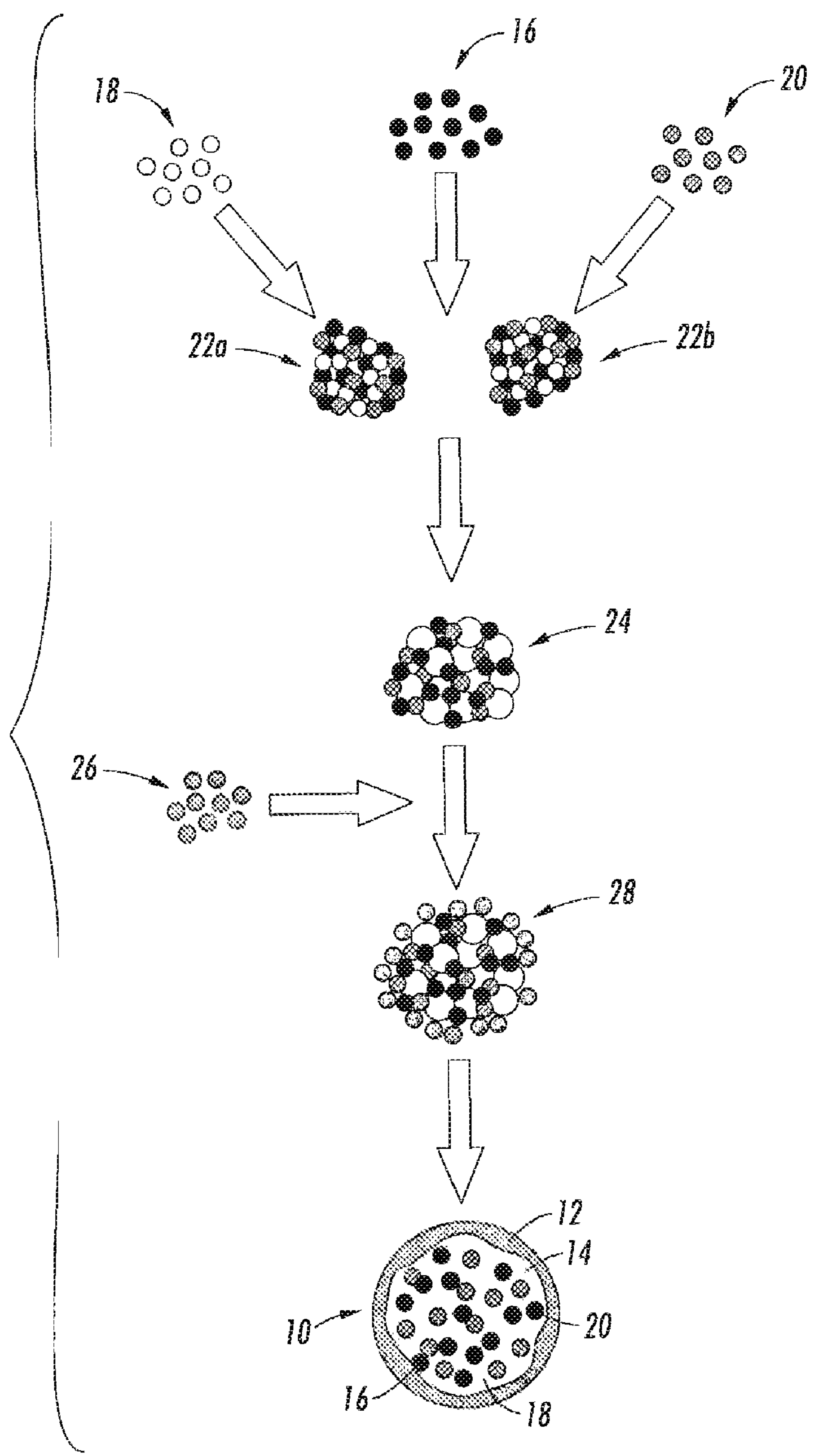
FIG. 1 is a process of producing an electrophoretic particle having a core-shell structure in an embodiment of the present disclosure.

Generally, in various embodiments, there is provided fluorescent electrophoretic inks including therein at least one set of same colored core-shell particles including a fluorescent component. The ink may comprise at least two differently colored particle sets suspended in a substantially clear and/or colorless fluid of the ink, at least one of the sets being the core-shell particles, and the differently colored particle sets being movable within the fluid by an electric field. The ink may also comprise one set of same colored core-shell particles, in a fluid of a different color.

Thus, in the inks, at least one particle set comprises particles having a core-shell structure and including in the core fluorescent compounds to enhance a color contrast displayed between colors of the display device.

The inks may be positioned within reservoirs, for example encapsulated within microcapsules, in a display layer of an electrophoretic display. It should be understood that the reservoir may be any type of reservoir capable of containing the ink therein.

The inks may include two or more differently colored particle sets that may be comprised of differently colored particles having core-shell structures and core fluorescent compounds. In embodiments, all of the differently colored particle sets within the inks may be comprised of core-shell structures and core fluorescent compounds. The inks may include at least one white particle set which may or may not be comprised of white particles having core-shell structures and core fluorescent compounds, and an additional differently colored particle set that may or may not have the core-shell structure, so long as one of the particle sets has the core-shell structure. The fluid of the inks may be colored and may suspend at least one colored particle set that may be comprised of the colored particles having the core-shell structure and the core fluorescent compounds.

The ink may include at least one set of particles exhibiting substantially the same color suspended in the fluid of the ink, including at least two, such as from two to ten or from two to four, sets of differently colored particles dispersed in the fluid. Color refers to, for example, the overall absorption characteristic within the range of wavelengths of the electromagnetic spectrum. Substantially the same color herein refers to, for example, particles exhibiting substantially the same hue and contrast (darkness/lightness) as other particles in the set. Colored particles of different sets of electrophoretic particles in the ink exhibit a color, that is, an absorption characteristic, different from each other. For example, if a first set of electrophoretic particles exhibits a yellow color, then a second differently colored set of electrophoretic particles will exhibit a different shade (hue and/or contrast) of yellow or a different color altogether, for example such as cyan or magenta.

The ink may include two sets of differently colored electrophoretic particles, for example black particles and white particles. In embodiments, the ink comprises at least three differently colored sets of electrophoretic particles. As examples, the three sets of electrophoretic particles may comprise the three subtractive primary colors yellow, cyan and magenta, or may comprise red, blue and green. An ink containing four sets of differently colored electrophoretic particles may comprise yellow, cyan, magenta and black. Additional differently colored sets of electrophoretic particles, for example for highlight coloring, may be included as additional sets of colored electrophoretic particles in any embodiment described herein.

Each electrophoretic particle within a first set of electrophoretic particles may display, may present or may provide a first color. Further, each electrophoretic particle within a second set of electrophoretic particles may display, may present or may provide a second color that is different from the first color. In embodiments, a first set of electrophoretic particles may be a color, such as, red, orange, yellow, green, blue, green or black, and a second set of particles may be white. Alternatively, the first set of electrophoretic particles may be a non-white color and the second set of electrophoretic particles may be a different non-white color. In embodiments, the first set of electrophoretic particles may be one of cyan, yellow, magenta and black. Moreover, the second set of electrophoretic particles may be a different one of cyan, yellow, magenta and black than the color of the first set of particles.

In embodiments, the first set of electrophoretic particles and/or the second set of electrophoretic particles may include the fluorescent component that may increase a color contrast between the first color and the second color. Furthermore, the fluorescent component may increase right that is emitted from the ink at a wavelength that corresponds to the first color and/or the second color.

At least one set of particles has a core-shell structure that includes a shell and a core. The shell may be clear and/or may provide mechanical and thermal strength for the particles. The shell may have a charging capability for electrostatically charging the core-shell particles. The core of the electrophoretic particles may include a colorant, a resin binder and the fluorescent compounds. As a result, the electrophoretic particles may absorb UV light and may emit visible light at a wavelength of a display color associated with the colorant to enhance a color contrast between differently colored electrophoretic particle sets. The colorant may comprise dyes, pigments or a combination of dyes and pigments.

The core of the electrophoretic particles may include the fluorescent compounds and a desired colorant. The core of the electrophoretic particles may also comprise one or more polymer binders. Polymers that may be used for the electrophoretic particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific examples include, for example, polyethylene, polypropylene, polymethylmethacrylate, polyisobutyl methacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials.

The colorant may be, for example, a pigment dispersion of pigment particles that are white, black, red, blue, green, cyan, magenta or yellow or the like. The colored electrophoretic particles may include colorant that comprises dyes, pigments such as neat pigments, dyed (laked) pigments, pigment/polymer composites, dyed or pigmented agglomerated polymer particles, mixtures of dyes, mixtures of pigments or mixtures of dyes and pigment. Laked, or dyed, pigments, in which a dye is precipitated on the colored particles or the colored particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt, may be used.

Examples of pigments for the colorant that may be used include neat pigments such as, for example, titania, barium sulfate, kaolin, zinc oxide, carbon black and the like. The pigment should be insoluble in the suspending fluid. Additional pigments may include, for example, carbon black such as REGAL 330 carbon black, acetylene black, lamp black, aniline black, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF) NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); mixtures thereof and the like.

As dyes for the colorant, examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASE) are preferred.

The colorant may be included in the electrophoretic particles in an amount of from, for example, about 0.1% to about 75% by weight of the electrophoretic particle, for example from about 1% to about 50% by weight or from about 3% to about 25% by weight of the electrophoretic particle. In embodiments, the colorant may be about 2% to about 15% of the total weight of the electrophoretic particle.

The fluorescent compound of the core may be a fluorescent dye or a fluorescent pigment. In embodiments, the fluorescent compound may be initially invisible to a viewer, and subsequently rendered visible by subjecting it to ultraviolet light or visible light. The fluorescent compounds may fluoresce in the spectrum of from about 300 to about 700 nanometers. In embodiments, fluorescent particles may be about 0.05% to about 10% of a total weight of the electrophoretic particle, for example from about 3.5% to about 7% of a total weight of the electrophoretic particle.

The fluorescent compounds may include a daylight fluorescent colored material that may absorb UV light and visible light to provide fluorescence. In embodiments, the fluorescent compounds of the electrophoretic particles may include one or more of 4,4'-bis(styryl)biphenyl, 2-(4-phenylstilben-4-yl)-6-t-butylbenzoxazole, β-methylumbelliferone, 4-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, DAYGLO INVISIBLE BLUE™ A-594-5 or the like.

The shell for the electrophoretic particle may be made of a clear or transparent polymer. As a result, the core of the electrophoretic particle may be visible through the shell of the electrophoretic particle. A surface of the shell may receive an electrostatic charge in the display medium within the microcapsules. As a result, the shell of the electrophoretic particle may allow electrostatic charging of the electrophoretic particle. The shell polymer particles may be made from, for example, latex or the like. In embodiments, the polymer binders and the shell polymer particles may be made from the same or different materials. Moreover, the shell may include any polymer binders as set forth above.

Examples of suitable polymers that may be used to form the core and/or the shell may include polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. For example, the core and/or the shell may be made from polyethylene, polypropylene, polymethylmethacrylate, polyisobutyl-methacrylate, polystyrene, polybutadiene, polyisoprene, polyisobutylene polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, copolymers of two or more of these materials or the like.

Examples of suitable acrylate resin binders for the emulsion aggregation particles and shells may include, for example, polymers, such as poly(styrene-alkyl acrylate), poly (styrene-1,3-diene), poly(styrene-alkyl methacrylate), poly (styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid). Further, the latex may contain a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), polypropyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl metacrylate-isoprene), poly(butyl methacrylate-isoprene), poly(methyl acrylate-isoprene), poly(ethyl acrylate-isoprene), polypropyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid).

For polyester emulsion-aggregation, the shell may be formed from, for example, polyester polymers that may include polyethylene terephthalate, polypropylene terephthalate, polybutylene terephthalate, polypentylene terephthalate, polyhexylene terephthalate, polyheptadene terephthalate, polyoctalene terephthalate, polyethylene sebacate, polypropylene sebacate, polybutylene sebacate, polyethylene adipate, polypropylene adipate, polybutylene adipate, polypentylene adipate, polyhexylene adipate, polyheptadene adipate, polyoctalene adipate, polyethylene glutarate, polypropylene glutarate, polybutylene glutarate, polypentylene glutarate, polyhexylene glutarate, polyheptadene glutarate, polyoctalene glutarate polyethylene pimelate, polypropylene pimelate, polybutylene pimelate, polypentylene pimelate, polyhexylene pimelate, polyheptadene pimelate, poly(propoxylated bisphenol fumarate), poly(propoxylated bisphenol succinate), poly(propoxylated bisphenol adipate), poly(propoxylated bisphenol glutarate), mixtures copolymers or combinations thereof, and the like.

Chemical processes that may be used in forming the colored electrophoretic particles include, for example, emulsion aggregation, dispersion polymerization, mini- or micro-emulsion polymerization, suspension polymerization, precipitation, phase separation, solvent evaporation, in situ polymerization, or any process of microencapsulation.

In embodiments, the electrophoretic particles having the core-shell structure may be emulsion aggregation particles, for example including polyester resin based emulsion aggregation particles and styrene-acrylate or acrylate resin based emulsion aggregation particles. Such electrophoretic particles are chemically grown and tend to be substantially monodisperse in size and substantially spherical in shape. Another advantage to emulsion aggregation particles is that the particle surface of the electrophoretic particles may be substantially completely passivated by the binder resin, which may eliminate the contribution of the colorant, such as pigment, to the particle charge.

As surfactants for use in making emulsion aggregation particles for the electrophoretic particles as discussed above, examples include anionic, cationic, nonionic surfactants and the like.

Electrophoretic particles having a core-shell structure may be formed by combining the materials for the core, such as resin binder particles, colorant particles and fluorescent colorant particles. This combination of core particles may be aggregated by any suitable method and may be exposed to heat to form an aggregation of core particles. The core particles may continue to be aggregated until the aggregation achieves a desired size. The material for the shell particles may then be added to the aggregated core particles to form the shell thereon. Aggregation conditions may be maintained for a time sufficient to deposit a desired amount of shell on the core. The core-shell structure may be coalesced to achieve or to shape the core-shell structure into a spherical electrophoretic particle.

An example process for preparing the polyester based emulsion aggregation particles may include charging a polyester resin emulsion, for example an aqueous based emulsion optionally containing one or more surfactants, into a reactor, and adding a colorant to the reactor while stirring. A wax dispersion may optionally be added. The mixture may be stirred and heated to a desired temperature, for example from about 40° C. to about 70° C., such as from about 45° C. to about 70° C. or from about 40° C. to about 65° C. A solution of an aggregating agent may be pumped into the mixture to initiate growth/aggregation of the polyester particles.

An additional amount of resin emulsion may then be added, where it is desired to form a shell that is substantially free of coloring agent such as dyes, pigments or mixtures thereof on the core aggregated colored particles. The temperature of the reactor may then be raised towards the end of the reaction to, for example, from about 45° C. to about 75° C., such as from about 50° C. to about 75° C. or from about 45° C. to about 70° C., to allow for appropriate spherodization and coalescence to achieve the desired average particle size and shape. The slurry may be cooled, washed and dried.

An example method for making acrylate based emulsion aggregation particles may include first mixing resin emulsion, for example an aqueous based emulsion optionally containing one or more surfactants, a colorant, and a coagulating agent at a temperature at or above the glass transition temperature (Tg) of the resin, such as 5° C. to about 50° C. above the Tg of the resin, which Tg is usually in the range of from about 50° C., to about 80° C. or is in the range of from about 52° C. to about 65° C. The particles are permitted to grow or aggregate to a desired size.

An outer shell material for the aggregated particles, for example consisting essentially of binder resin that may be substantially free of coloring agent such as dyes, pigments or mixtures thereof on the core aggregated colored particles, may then be added, for example to form a shell on the aggregated particles having a thickness of about 0.1 to about 2 μm. The aggregation may then be halted, for example with the addition of a base. The particles may then be coalesced, for example at an elevated temperature such as from about 60° C. to about 98° C., until a suitable shape and morphology is obtained. Particles are then optionally subjected to further processing, for example wet sieved, washed by filtration, and/or dried.

In embodiments, the emulsion aggregation particles for the electrophoretic particle are made to have an average particle size of from about 0.5 to about 25 μm, for example about 5 to about 15 μm or about 5 to about 12 μm. The electrophoretic particle size may be determined using any suitable device, for example a conventional Coulter counter.

Although not required, the electrophoretic particles may also include additional known positive or negative charge additives in effective suitable amounts of, for example, from about 0.1% to about 5 weight % of the particles, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

The fluid of the ink suspending the set(s) of particles or electrophoretic particles may have densities that are substantially matched. For example wherein the densities of the fluid and the electrophoretic particles are within about 25% of each other, or more specifically within 20% of each other or within 10% of each other. In other embodiments, the fluid of the ink may comprise two immiscible fluids having different densities such that the first immiscible fluid having a density less than that of the second immiscible fluid rests on top of the second immiscible fluid, and at least one electrophoretic particle set has a density in between the densities of the two immiscible fluids such that the set of electrophoretic particles rest at an interface between the two immiscible fluids. The fluid of the ink may have a density that is "substantially matched" to the density of the electrophoretic particles dispersed therein if the difference in their respective densities is from about zero to about 2 g/ml, for example from about zero to about 0.5 g/ml.

The fluid of the ink may comprise from about 10% to about 95% by weight of the ink, for example from about 30% to about 90% or from about 40% to about 80% by weight of the ink.

The fluid of the ink may be comprised of any suitable fluid known in the art for use in electrophoretic displays. Fluid refers to, for example, a material in a liquid state, and is not a gas or air. Of course, air or any other gas may also be present in the display device, but the fluid of the ink refers to a fluid in a liquid state. The choice of fluid may be based on concerns of chemical inertness, density matching to the particles and/or the electrophoretic particles to be suspended therein and/or chemical compatibility with the electrophoretic particles. In embodiments, the suspending fluid may have a low dielectric constant (for example, about 4 or less, such as about 0.5 to about 2).

The viscosity of the fluid may be relatively low at the temperatures of operation in order to permit the electrophoretic particles to move therein, for example under the influence of an electrical field. In embodiments, the fluid of the ink may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the electrophoretic particles therein, and a specific gravity substantially equal to the electrophoretic particles, for example within about 20% of each other. Additionally, the fluid may be chosen to be a poor solvent for some polymers, which is advantageous for use in the fabrication of electrophoretic particles because it increases the range of polymeric materials useful in fabricating electrophoretic particles.

Organic solvents such as halogenated organic solvents, saturated linear or branched hydrocarbons, silicone oils, and low molecular weight halogen-containing polymers may be a few suitable types for the fluid that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOL-TROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly (chlorotrifluoroethylene) polymer or KRYTOX™ polymers (Dupont).

Typically, hydrocarbon fluids such as ISOPAR™ are used for electrophoretic ink applications due to their low cost, good dielectric strength, low volatility, and nonreactivity.

The aliphatic hydrocarbons may cause degradation of performance, for example when non-crosslinked emulsion aggregation particles are used as the electrophoretic particles for the fluorescent electrophetic ink and/or when the electrophetic particles are imparted with a charge by treatment with a surface coating that can be desorbed from the particle surface in the presence of an aliphatic hydrocarbon. Thus, it may be desirable to use, as the fluid of the ink, a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T 01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy) silane fluids such as SIP6827.0, phenethyltris(trimethylsiloxy)silane fluids such as SIP6722.8, and the like.

If colored, the fluid may be colored by any suitable means in the art, including through the inclusion of suitable dispersible colorants such as dyes and/or dispersible pigments therein.

The fluid may be substantially free of charge control additives and other ionic species that may affect the charging behavior of the electrophoretic particles dispersed therein. However, in other embodiments, the fluid may contain additives such as surface modifiers to modify the surface energy or charge of the particles and such as charge control agents, dispersants, and/or surfactants.

In embodiments, described are low electrical conductivity electrophoretic particle sets, for example having a conductivity on the order of about $10^{-11}$ to about $10^{-15}$ S/m, such as from about $10^{-12}$ to about $10^{-14}$ S/m or from about $10^{-}12$ to about $10^{-13}$ S/m. The conductivity of the electrophoretic particles is thus comparable to that of the fluid of the ink. The electrophoretic particle sets in the ink may become charged by the application of a high electric field thereto, which may also be referred to as field-induced or in situ charging, in which particle charging is dependent on, for example, the field strength and the charging time (or number of charging cycles). Following charging, the electrophoretic particles may have a charge (charge to mass ratio) on the order of microcoulombs (μC) per gram (that is, on the order of $10^{-6}$ C/g), such as from about ±0.0 to about ±20 μC/g, from about ±0.2 to about ±10 μC/g or from about ±0.3 to about ±5 μC/g.

The fluorescent electrophoretic ink may be included in a display layer of an electrophoretic display device. To position the ink in the device, a layer of reservoirs including spacers therein may be formed on or within the substrate. Each of the spacers may define a multiplicity of individual reservoirs that each contain the ink comprised of the fluid and colored particle sets or colored electrophoretic particle sets. A multiplicity refers to, for example, from about 2 to about 100,000,000, or potentially more, such as from about 100 to about 50,000,000 or from about 1,000 to about 1,000,000. Thus, for example, if each of the multiplicity of reservoirs is about 100 microns across, a square of 1,000×1,000 reservoirs (or about a 4 inch×4 inch display) would have about 1,000,000 total reservoirs. In this regard, each reservoir may be thought to correspond to a pixel or a subpixel of the display device. Reservoir refers to, for example, any unit containing, or capable of containing, ink therein, and includes, for example, units separated by a spacer device, pockets, cavities or bubbles formed in a single sheet or between two sheets, capsules or microcapsules is a sheet or layer of reservoirs, and the like.

In embodiments, spacers may be used to keep the individual reservoirs separate from one another. Any suitable spacer design may be used. For example, the spacer may be of the type described in U.S. Pat. No. 7,123,238, incorporated herein by reference in its entirety. The width and/or diameter of the individual reservoirs may be from, for example, about 5 microns to about 400 microns, such as from about 5 to about 200 microns or from about 5 to about 50 microns. Also, the spacer layer may be comprised of more than one layer/sheet, such as from two to about eight layers or from about two to about four layers, for example when pocket sheets having differently colored fluorescent electrophoretic inks therein are stacked together.

The inks to be used within the reservoirs contain colored particles or electrophoretic partices that have a size smaller than the reservoir width/diameter in order to function.

Where the display layer is comprised of a multiplicity of individual reservoirs, a solid portion of the spacer separating the multiplicity of reservoirs, that is, the spacing or partition between individual reservoirs of the spacer layer, are desirably as thin as possible. Preferred spacing/partition thicknesses are on the order of, for example, about 10 microns to about 100 microns, such as from about 10 microns to about 75 microns or from about 15 to about 50 microns.

In embodiments, the display device may be comprised of one or more polymeric film substrates that may have the spacer layer thereon. The spacer layer may comprise a grid pattern that may be formed on at least one of the substrates defining the display device. The grid pattern may be integral with one or more of the polymeric film substrates. Integral refers to, for example, the grid pattern walls or sidewalls that segregate the individual cells of the display device being comprised of the same material as the polymeric film substrate and being formed with the polymeric film in the same molding step. For flexibility, each film may have a thickness of from about 5 to about 75 μm, for example from about 10 to about 50 μm or from about 10 to about 30 μm. The overall device including joined films may have a thickness of less than 150 μm, for example from about 10 to about 150 μm or from about 20 to about 75 μm.

Another embodiment for forming reservoirs to be filled with fluorescent electrophoretic ink may include a multiplicity of microcapsules that have the ink encapsulated therein. The microcapsules may be held in a suitable matrix material used as the display layer. Microcapsules for forming electrophoretic display devices are described in U.S. Pat. No. 6,017,584, incorporated herein by reference in its entirety. The microcapsules may be any microcapsule that is capable of encapsulating particles having a core-shell structure for forming a display device.

The microcapsules may be comprised of at least the fluid of the ink and at least one, for example at least two, such as from two to ten or from two to four, set(s) of colored particles, white particles and/or colored electrophoretic particles, at least one set of which is the core-shell particles, dispersed in the fluid of the ink.

Each same colored electrophoretic particle in the microcapsules may comprise from about 5% to about 50% by weight, for example from about 5% to about 40% or from about 5% to about 30% by weight, of the microcapsules. The microcapsules may be made to have a size (diameter) of from, for example, about 5 microns to about 1,000 microns, such as from about 5 to about 200 microns or from about 5 to about 50 microns.

For making the microcapsules encapsulating the ink, any suitable method of encapsulation may be used. The process of encapsulation may include conventional or complex coacervation, interfacial polymerization, in-situ polymerization, electrolytic dispersion and cooling, or spray-drying processes. In these processes, the fluorescent electrophoretic ink is added to a solution of the wall-forming material to be encapsulated thereby, and the resulting encapsulated microspheres may be subjected to crosslinking. The microcapsules may be prepared using melamine-formaldehyde, urea-formaldehyde, resorcinol-formaldehyde, phenol-formaldehyde, gelatin-formaldehyde, isocyanate-polyol, interpolymer complexes of two oppositely charged polymers such as gelatin/gum arabic, gelatin/polyphosphate, and poly(styrene sulfonic acid)/gelatin, hydroxypropyl cellulose, mixtures and/or combinations of the foregoing, and the like, as microcapsule wall-forming materials.

The interfacial polymerization approach may rely on the presence of an oil-soluble monomer in an electrophoretic composition, which is present as an emulsion in an aqueous phase. The monomers in the minute hydrophobic droplets may react with a monomer to be introduced into the aqueous phase, polymerizing at the interface between the droplets and the surrounding aqueous display medium and forming shells around the droplets. Although the resulting walls are relatively thin and may be permeable, this process does not require the elevated temperatures characteristic of some other processes, aid therefore affords greater flexibility in terms of choosing the fluid of the fluorescent electrophoretic ink.

Coating aids may be used to improve the uniformity and quality of printed electrophoretic microcapsules. Wetting agents are typically added to adjust the interfacial tension at the microcapsule/substrate interface and to adjust the liquid/air surface tension. Wetting agents may include, for example, anionic and cationic surfactants, and nonionic species, such as silicone or fluoropolymer-based materials. Dispersing agents may be used to modify the interfacial tension between the microcapsules and binder or the substrate, providing control over flocculation and particle settling.

Surface tension modifiers may be added to adjust the air/ink interfacial tension. Polysiloxanes are typically used in such an application to improve surface leveling while minimizing other defects within the coating. Surface tension modifiers include, for example, fluorinated surfactants, such as, for example, the ZONYL series from DuPont, the FLUORAD series from 3M (St. Paul, Minn.), and the fluoroalkyl series from Autochem; siloxanes, such as, for example, SILWET from Union Carbide; and polyethoxy and polypropoxy alcohols. Antifoams, such as silicone and silicone-free polymeric materials, may be added to enhance the movement of air from within a microcapsule formation solution to a surface of the substrate and to facilitate the rupture of bubbles at the surface. Other useful antifoams include, for example, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the microcapsules.

The coacervation approach may utilize an oil/water emulsion. One or more colloids are coacervated (that is, agglomerated) out of the aqueous phase and deposited as shells around the oily droplets through control of temperature, pH and/or relative concentrations, thereby creating the microcapsule. Materials suitable for coacervation include gelatins and gum arabic.

In an example complex coacervation process, the fluorescent electrophoretic ink to be encapsulated is emulsified with the wall forming material, for example a mixture of water, gelatin and gum arabic, at an elevated temperature of, for example, about 30° C. to about 80° C., such as from about 35° C. to about 75° C. or from about 35° C. to about 65° C. The pH is then reduced, for example to less than 5, for example from about 4 to about 5 such as from about 4.4 to about 4.9, through addition of an acid such as acetic acid and the like, to induce coacervation. The material of the wall of the microcapsules may then be crosslinked, for example by adding gluteraldehyde and the like and agitating the mixture in the presence of, for example, urea.

The microcapsules may have a multi-layer wall around the electrophoretic particles suspended within the fluid of the ink to define a shell of each microcapsule. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates, silicones and the like. The second wall of the microcapsule may be comprised of condensates of melamine-formaldehyde, urea-formaldehyde, resorcinol-formaldehyde, phenol-formaldehyde, gelatin-formaldehyde, or interpolymer complexes of two oppositely charged polymers such as gelatin/gum arabic and poly (styrene sulfonic acid)/gelatin.

A semi-continuous miniemulsion polymerization process may also be used to encapsulate the fluorescent electrophoretic ink or the electrophoretic particles, for example as described in U.S. Pat. No. 6,529,313, incorporated herein by reference in its entirety.

A benefit of encapsulating the fluorescent electrophoretic ink is that the microcapsules can be made to be spherical or other than spherical through control of the process. Different shapes may permit better packing density of the microcapsules and better display quality. The encapsulated particles may also be readily appropriately located at desired positions of the display device.

That is, once generated, the microcapsules may be applied to a substrate by a suitable dispensing, printing or application method. The microcapsules may adhere to the surface of the substrate by, for example, using any suitable binder such as an adhesive or polymer matrix material that is either mixed with the reservoirs prior to applying the reservoirs on the substrate, coated onto the substrate before application of the microcapsules thereon, coated upon the microcapsules after placement upon the substrate, or one or more of the above, including all three. In embodiments, the microcapsules may be formed on or in the substrate or one or more of the conductive substrates.

As an adhesive or binder, any material may be used, for example including polyvinyl alcohol (PVA) or polyurethane such as NEOREZ. A binder may be used as an adhesive medium that supports and protects the reservoirs, as well as binds conductive substrate to the reservoirs dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among water-soluble polymers are various polysaccharides, polyvinyl alcohols, N-methylpyrolidone, N-vinylpyrrolidone, various CARBOWAX species (Union Carbide), and poly(2-hydroxyethyl acrylate).

The water-dispersed or water-borne systems are generally latex compositions, for example NEOREZ and NEOCRYL resins (Zeneca Resins), ACRYSOL (Rohm and Haas), BAYHYDROL, (Bayer), and the HP products (Cytec Industries). These may generally be lattices of polyurethanes, occasionally compounded with one or more of acrylics, polyesters, polycarbonates or silicones, each lending the final cured resin in a specific set of properties defined by glass transition temperature, degree of tack, softness, clarity, flexibility, water permeability and solvent resistance, elongation modulus and tensile strength, thermoplastic flow, and solids level. Some water-borne systems may be mixed with reactive monomers and catalyzed to for more complex resins. Some may be further cross-linked by the use of a cross-linking reagent, such as an aziridine, for example, which reacts with carboxyl groups.

In the display layer formed on the surface of the substrate by the reservoirs, the microcapsules may be arranged in abutting, side-by-side relationship and in embodiments are arranged in a monolayer of microcapsules on the substrate. However, more than one display layer of microcapsules may also be used. The electronic display may be formed by at least one display layer of microcapsules, for example, one to ten display layers of the microcapsules, such as one to four display layers of the microcapsules or one to two display layers of the microcapsules. The display layer of microcapsules may have a thickness of from about 5 to about 1,000 μm, for example from about 10 to about 500 μm or from about 20 to about 350 μm.

The ink and particle sets therein of embodiments herein may be made to be substantially free of charge control additives and similar excess ionic species affecting the charging characteristics and/or conductivity of the particle sets. Substantially free of ions herein refers, for example, to the electrophoretic particle sets being free of ionic species to the extent that the aforementioned conductivity values may be achieved. As a result, the electrophoretic particle sets herein are able to exhibit the aforementioned low conductivity properties.

As a result of the desired absence of charge control additives in the ink, the electrophoretic particles in the ink need to be made to include a capability of exhibiting the low charging property by other methods. Such may be accomplished, for example, by the formation of the electrophoretic particles in the presence of a surfactant and/or water, wherein small amounts of these materials may be incorporated into the particles during formation. Other components that could impart the charge to the electrophoretic particles include polymerization initiators such as APS (ammonium persulfate), chain transfer agents such as DDT (dodecylthiol), or acidic/basic functional groups in the polymer backbone that may be exposed or partially exposed on the particle surface. These materials may act as charge species in the electrophoretic particles, imparting an almost negligible charge at time zero but that which enables the electrophoretic particles to be charged, for example through application of a high electric field as will be described more fully below, to the low charge values described above.

These materials are part of the electrophoretic particles and substantially do not become dissociated in the ink, thereby enabling the ink and/or the electrophoretic particles to maintain the low conductivity. Moreover, unlike prior systems requiring the presence of ionic species in the ink that permit the display to degrade in performance over time, for example through the generation of wrong sign particles and/or loss of sufficient ionic species in the ink, the electrophoretic particles herein do not generate ionic species and do not require the presence of ionic species for charging, and thus are not subject to such degradation risks.

One or more reservoirs may define or form one pixel of the display device. In embodiments, each reservoir may define or form a subpixel of one pixel of the display device. It is desirable to have several differently colored two particle reservoirs comprise a portion of the display equivalent to one pixel of the display. Each reservoir, each subpixel and/or each pixel may include a set of white particles and a set of colored electrophoretic particles, or more than one set of differently colored electrophoretic particles. For example, different reservoirs of a same pixel may comprise red/white, blue/white, green/white and optionally black/white, or red/green, blue/green, red/blue and optionally black/white.

In embodiments, the reservoirs may form a display layer for the ink that may be differently colored to form a full colored or multicolor display layer.

A color display refers to, for example, any display capable of displaying at least two different colors. Examples include black and white colors, as well as full color displays such as red, green, blue and/or black, or cyan, magenta, yellow and/or black, and highlight color displays, including two colors highlighted and/or shaded with a third color.

The electronic display may be formed by sandwiching the substrate with at least one display layer of reservoirs between a front conductive substrate and a rear conductive substrate. If desired, different display layers of reservoirs applied to the surface of the substrate may be used for differently colored inks. The conductive substrates may be made to be as thin as possible while still maintaining appropriate conductive properties and structural integrity. For example, the conductive substrates may have a height, or thickness, of from about 10 microns to about 500 microns, such as from about 10 to about 250 microns or from about 20 to about 100 microns.

Conductive substrates may be used to apply an electric field, for example as supplied via electrodes associated with at least one of the conductive substrates, to the reservoirs to manipulate movement of the differently colored particle sets and/or the differently colored electrophoretic particles. As a result, the reservoirs may display intended or desired colors that are seen by a viewer at locations and/or pixels, thereby displaying an image with the fluorescent electrophoretic ink.

The electronic display device may be made to include an absorptive backplane, for example a light absorptive backplane. The electronic display device may be a very thin display device with the conductive substrates that nay be substantially clear. The conductive substrates may be made from, for example, indium tin oxide (ITO) coated glass or ITO coated polymer such as MYLAR may exhibit low optical density, and a washed out appearance with low color saturation. A highly absorptive backplane may reduce the light transmission through the electronic device, thereby eliminating the washed out appearance of the display device. The contrast is greater, and the color saturation appears higher. In embodiments, the conductive substrates may be made from a non-flexible material or the like.

The electrophoretic particles may absorb UV light and/or may emit light at a wavelength of a display color for the display device to increase a perceived color intensity of the display color with respect to the surrounding conditions around the display device. The electrophoretic particles may increase color contrast between white portions and color portions of the image displayed or produced by the display device.

The display device may have any suitable overall length and width as desired. The display device may also be made to have any desired height, although a total height of from about 30 to about 1,000 microns, such as from about 30 to about 400 microns or from about 50 to about 300 microns, may be used in terms of size and ease of use of the display device.

The absorptive backplane may desirably have a black color. This may be achieved by any suitable method. For example, a black colored film or paint may be added onto the substrate having the display layer of reservoirs thereon. The absorptive backplane may be applied either before or after formation of the display, for example, before application of the reservoirs to the substrate, or after applying the display layer of reservoirs onto the substrate. Also, the coloring agent imparting the dark color such as black may be incorporated directly into the substrate having the display layer of reservoirs or onto the rear conductive substrate, such that the rear conductive substrate acts as both the conductive layer and the absorptive backplane.

Example methods for controlling movement of the sets of electrophoretic particles in the ink within the reservoirs and controlling image formation by the ink within the reservoirs is described in application Ser. No. 11/419,440, filed May 19, 2006, which is incorporated herein by reference in its entirety.

In operating the ink and/or colored electrophoretic particles of the electrophoretic display device so as to form an image therewith, an electric field, in particular a reversible direct current or an alternating current, is applied directly to or adjacent to the reservoirs of the display layer by at least one of the conductive substrates. As a result, the electric field may move one or more desired particle sets or desired electrophoretic particle sets in the reservoirs so as to be displayed by the display device.

In embodiments of the display device, each of the individual reservoirs may be individually addressable, that is, a separate electric field may be applied to each individual reservoirs in the display layer to generate an appropriate color with the ink in that individual reservoirs. Appropriate sets or groups of different ones of the individual reservoirs may also be associated with a same driving electrode in one or more of the conductive substrates. For example, in a display device, each reservoir or a group of reservoirs in the display layer may represent a pixel or sub-pixel of an image, and each pixel or sub-pixel may thus be separately controlled to generate a desired overall image from the display device.

Control methods, including hardware/software, for controlling the ink in each reservoir in the display layer of the display device in a manner enabling an overall image to be shown are known in the display arts, and any such control method may be applied herein. To permit individual addressability, the size of the electrodes of the conductive substrates may be the same as or smaller than the size of the individual reservoir of the display device, enabling individual control of each. In this manner, the electric field applied to each reservoir can be individually controlled. Also, the size of the electrodes can be different from (for example, larger than) the size of the reservoirs, thereby enabling more than one reservoir to be controlled by a single electrode where the electrode is larger than an individual reservoir, or also enabling only a portion of the reservoir to be controlled (turned on and off) by an electrode where the electrode is smaller than the size of the reservoir. That is, the pattern of the electrodes does not need to line up with the reservoirs. Any of the foregoing can be done by, for example, appropriate patterning of the conductive path on the rear conductive substrate. An example of the patterning of electrodes can be found in, for example, U.S. Pat. No. 3,668,106, incorporated herein by reference in its entirety.

The strength of the electric field that may be applied to effect movement of the colored electrophoretic particle sets in the inks may be defined as the voltage divided by the thickness of the gap between the two conductive substrates. Typical units for electric field are volts per micron (V/μm). In embodiments, the charge level of each particle may have an electric field ranging from about 0.5 to about 3 V/μm. Applied electric fields may range from about 0.1 V/μm to about 25 V/μm, for example from about 0.25 V/μm to about 5 V/μm, or from about 1 V/μm to about 2 V/μm, or any ranges in between. The duration of electric field application can range from about 10 msec to about 5 seconds, or from about 100 msec to about 1 second, or any ranges in between. Generally, the greater the charge on the electrophoretic particles, the faster the electrophoretic particles will move for a given electric field strength.

The above controls over the display of colors in a multi-color system may be applied to a display layer of reservoirs having fluorescent electrophoretic inks that containing any number of differently colored electrophoretic particle sets, for example including two, three, four or even more differently colored electrophoretic particle sets. Highlight color particle sets, for example blue highlight color, red highlight color, often highlight color and the like highlight color particle sets may be included in multi-color particle sets to add additional color range capabilities to the display, and the control of the colors may be effected as described above. The total particle sets, including highlight color particle sets, in the inks thus may be five, six, seven, eight or even more.

Figure 2:
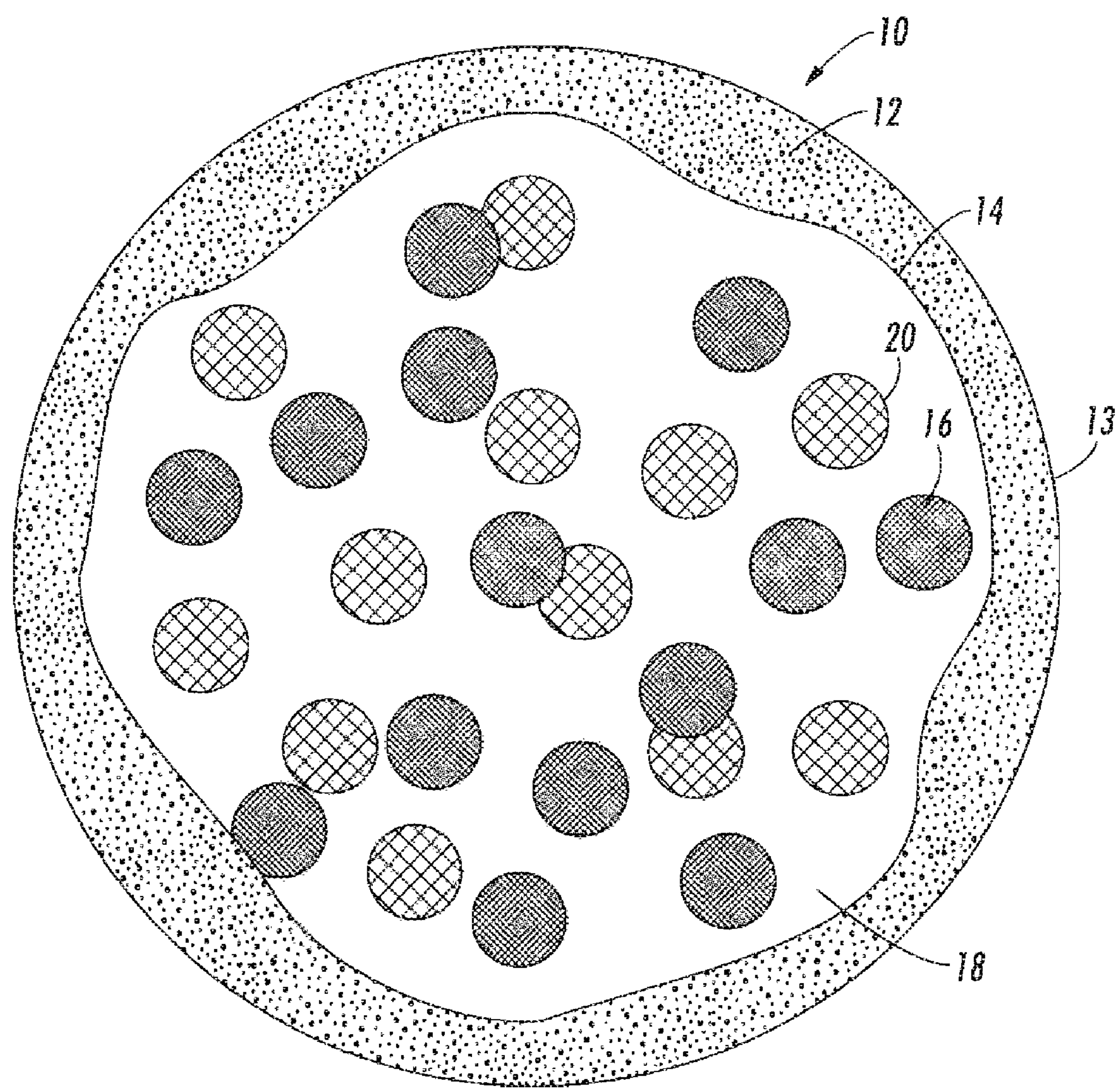
FIG. 2 is a cross section of an electrophoretic particle having a core-shell structure in an embodiment of the present disclosure.

Referring now to the drawings wherein like numerals refer to like parts, FIG. 1 illustrates a process of producing an electrophoretic particle 10 having a core-shell structure in an embodiment of the present disclosure. FIG. 2 shows a detailed cross-sectional view of the electrophoretic particle 10. The shell 12 may provide mechanical strength or thermal strength to prevent damage to the core 14 of the electrophoretic particle 10.

A core 14 of the electrophoretic particle 10 may include color pigment particles 16, resin binder particles 18 aid fluorescent compounds 20. The fluorescent compounds 20 may be formed from or with the fluorescent compounds. The color pigment particles 16 may comprise of the colorant for displaying a color, such as red, green, blue, black, white, cyan, magenta, yellow, a highlighted color or the like.

The electrophoretic particle 10 having the fluorescent compounds 20 may absorb UV light and emit light at a wavelength corresponding to a wavelength of the color of the colorant for the color pigment particles 16. The core 14 of the electrophoretic particle 10 may reflect more light outward towards a viewer of the inks having the electrophoretic particle 10 with the fluorescent compounds 20 than inks that do not have the fluorescent compounds 20 therein and/or may increase a perceived color intensity of the color of the color pigment particles 16. As a result, the electrophoretic particle 10 may increase a color contrast between reservoirs having electrophoretic particles 10 with differently colored pigment particles 16. Additionally, the electrophoretic particle 10 may increase a color contrast between reservoirs having particles displaying a color associated with the pigment particles 16 and reservoirs having particles displaying white or different colors than the color of the color pigment particles 16.

FIG. 1 illustrates an embodiment of a process for producing the electrophoretic particle 10 by emulsion aggregation. As shown in FIG. 1, the color pigment particles 16, the resin binder particles 18 and the fluorescent compounds 20 may be combined or mixed to form partial core components **22*a*, 22*b*. The partial core components 22*a*, 22*b* may be exposed to heat or may be heated to form a core component 24. The amount of heat applied to the partial core components 22*a*, 22*b* to form the core component 24 may be less than a glass transition temperature Tg of the resin binder particles 18**.

Shell polymer particles 26 may be added to or may be mixed with the core component 24 to form the shell 12 of the electrophoretic particle 10. The shell polymer particles 26 may be made from, for example, latex or the like. As a result, the core component 24 and the shell polymer particles 26 may form a core-shell composition 28 as shown in FIG. 1.

Coalescence of the core-shell composition 28 may occur to form the core-shell structure of the electrophoretic particle 10. The core-shell composition 28 may be exposed to heat or may be heated to form the colored electrophoretic particle 10 as shown in FIG. 1. The heat applied to the core-shell composition may be greater than the Tg of the resin binder particles 18 and/or the shell polymer particles 26. As a result, the shell polymer particles 26 may form the shell 12 of the electrophoretic particle 10 and the color pigment particles 16, the resin binder particles 18 and the fluorescent compounds 20 may form the core 14 of the electrophoretic particle 10 as shown in FIGS. 1 and 2. The Tg of the resin binder particles 18 and/or the shell polymer particles 26 may be, for example, from 50° C. to 80° C. or from 52° C. to 65° C. The heat applied to the core-shell composition may be, for example, from 5° C. to 50° C. above the Tg of the resin binder particles 18 and/or the shell polymer particles 26.

The resin binder particles 18 may bind the color pigment particles 16 and the fluorescent compounds 20 within the shell 14 as shown in FIG. 2. Thus, the core 14 of the electrophoretic particle 10 comprises the resin binder particles 18, the fluorescent compounds 20 and the color pigment particles 16.

In embodiments a formation process may molecularly disperse the fluorescent particles 20 in the resin binder 18 to form the core 14 of the colored electrophoretic particle 10. In embodiments, colored electrophoretic particles 11 may be suspending within the fluid of the ink that may prevent solubility of the electrophoretic particle 10 or any components thereof in the fluid. Namely, the electrophoretic particles 10, the resin binder particles 18, the fluorescent compounds 20 and the color pigment particles 16 may not be dissolvable in the fluid that may suspend the electrophoretic particle 10 within the reservoirs.

In embodiments, the fluorescent compounds 20 may be dispersed within the shell or walls of the reservoirs to absorb UV light and emit visible light. The fluorescent compounds 20 may be dispersed into the shells or the walls of the reservoirs during formation of the reservoirs. Further, the fluorescent compounds 20 may not be solubilized by the solution of wall-forming material and/or the reservoir formation solution during formation of the reservoirs.

The ink may display the color of the color pigment particles 16 by moving one or more colored electrophoretic particle sets within the reservoirs with respect to the substrate and/or one or more of the conductive substrates. Light at the wavelength of the desired color may be visible through the top conductive substrate and the fluorescent particles 20 in the reservoir may reflect and/or emit additional light at a substantially similar or similar wavelength as the wavelength of the color of the color pigment particles 16 to display a brighter color and/or an increased intensity for the color. As a result, color contrasts between different colored electrophoretic particle sets may be increased by the light emitted or reflected by the fluorescent particles 20 within the reserviors.

In embodiments, the reservoir for the ink may be, for example, a microcapsule 50 that may be formed as described above and shown in FIGS. 3 and 4. The microcapsule 50 may be, for example, an electrophoretic microcapsule having at least one set of colored electrophoretic particles 10 suspended in a fluid 51 of the fluorescent electrophoretic ink therein. In embodiments, the microcapsule 50 may encapsulate the ink with the electrophoretic particles 10 having the fluorescent compounds 20. In other embodiments, the fluorescent compounds 20 may be suspended in the fluid 51 of the fluorescent electrophoretic ink. Thus, the microcapsule 50 may contain the fluid 51, the fluorescent compounds 20, and at least one set of colored electrophoretic particles 10.

Figure 3:
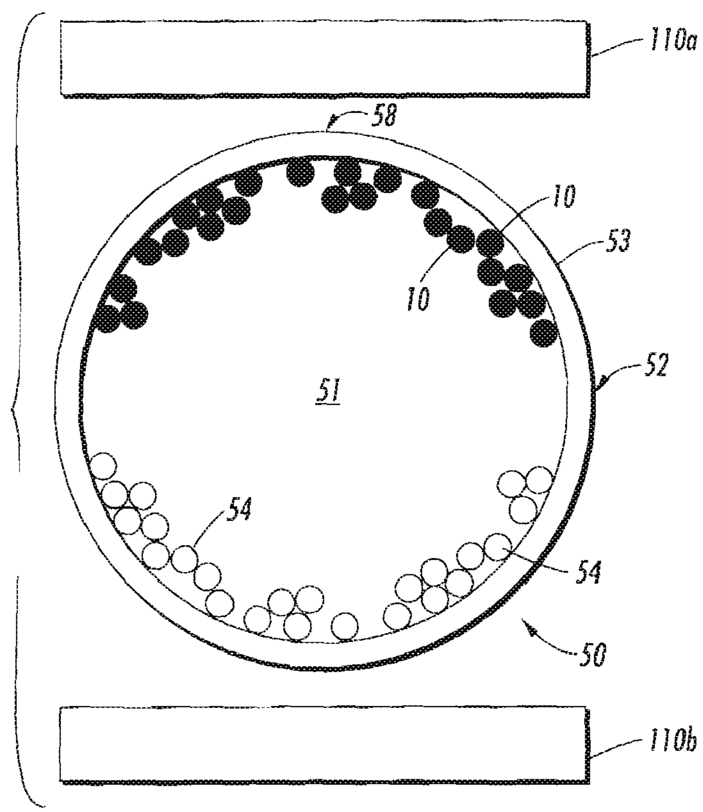
FIG. 3 is a cross-sectional view of a microcapsule having suspended sets of particles in a first state in an embodiment of the present disclosure.
Figure 4:
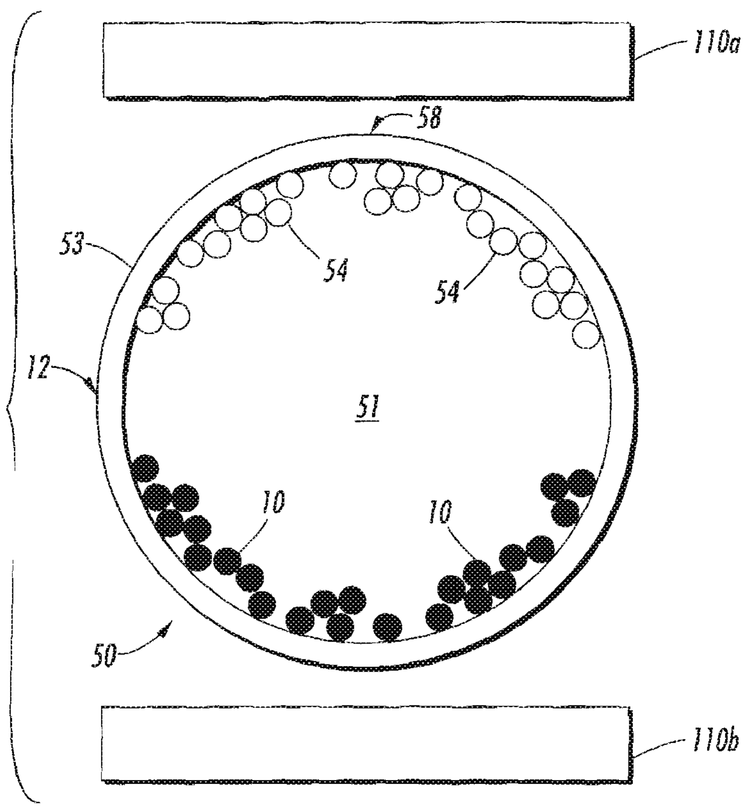
FIG. 4 is a cross-sectional view of a microcapsule having suspended sets of particles in a second state in an embodiment of the present disclosure.

The microcapsule 50 may have a shell 52 that encapsulates the ink having a set of colored electrophoretic particles 10 anchor a set of white particles 54 (hereinafter "sets of particles 10, 54") as shown in FIGS. 3 and 4 and described above. The sets of particles 10, 54 may be suspended in the ink within the shell 52 of the microcapsule 50, and may be located in a color mode or in a white mode as illustrated in FIGS. 3 and 4, respectively. In embodiments, the shell 52 of the microcapsule 50 may have an outer surface 53 that may have the adhesive thereon as described above. In embodiments, the white particles 54 and/or the electrophoretic particles 10 may contain fluorescent compounds 20. Not just particle 10. Thus, if the color pigment for the colored electrophoretic particles 10 is white, the colored electrophoretic particles 10 may be the same as or similar to the white particles 54.

In embodiments, the set of colored electrophoretic particles 10 having the core-shell structure that may comprise color pigment particles 16 of a first color to display the first color with the microcapsule 50. Additionally, an electrostatic charge may be applied to the shell 12 of the electrophoretic particles 10 in the display medium of the microcapsule 10 for moving the colored electrophoretic particles 10 and the white particles 54 between the color mode and the white mode to display the first color or white, respectively.

FIGS. 5-8 illustrate a method for producing a color electrophoretic display 100 (hereinafter "display 100") with a multiplicity of microcapsules 50 having at least one set of colored electrophoretic particles 10 with the core-shell structure. The display 100 may be, for example a four-color display with high resolution (Thereinafter "four-color display") or a highlight two-color display with high resolution (hereinafter "two-color display"). In embodiments, the four-color display may include full color, such as red, green, blue and black. In embodiments, the two-color display may include a non-white color and white, black and white or two different non-white colors. A two-color display and a four-color display refers to, for example, any display capable of displaying two different colors and four different colors, respectively. Examples include black and white colors, as well as full color displays such as red, green, blue and/or black, or cyan, magenta, yellow and/or black, and highlight color displays, including two colors highlighted and/or shaded with a third color and/or a fourth color. The fluorescent component 20 of the colored electrophoretic particles 10 may be capable of display a fluorescent color that may correspond to at least one of the colors displayable by the four-color display or the two-color display.

Figure 5:
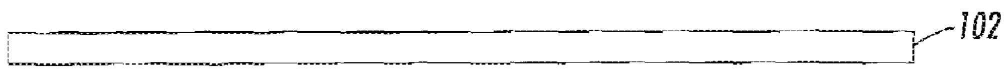
FIGS. 5-8 are steps for forming an electrophoretic display in an embodiment of the present disclosure.

In FIG. 5, a substrate 102 may be provided to receive the microcapsules 50. The substrate 102 may require a surface of the substrate to be coated with an agent, such as a microcapsule immobilizing agent to retain the microcapsules 50 to the substrate 102. In embodiments, the substrate 102 may be made of a flexible material, such as, for example, a plastic or the like. Alternatively, the substrate 102 may be rigid. In embodiments, the substrate 102 may be a light reflecting or light absorbing material.

As suitable materials that may be used, mention may be made of conductive polymer films, for example polymer films coated with a transparent conductive material such as indium tin oxide (ITO), such as polyethylene terephthalate (PET) films, for example MYLAR (Du Pont), polyethylene napthalate (PEN) films, polyethersulfone (PES) films and the like, conductive glass films, such as ITO coated glass, and conductive thin metals. For transparency, ITO coated polymer films and glass are suitable.

Figure 6:
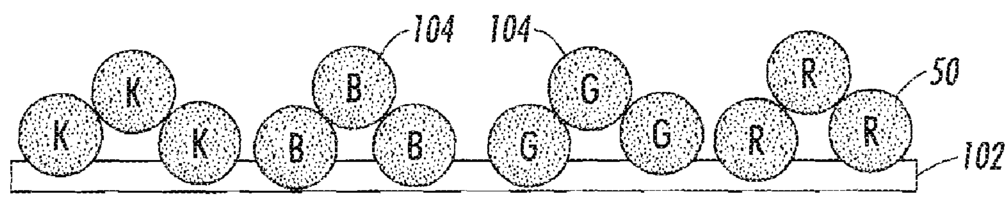

After formation of the microcapsules 50 having the fluorescent electrophoretic ink with at least one set of colored electrophoretic particles 10 having the core-shell structure, the microcapsules 50 may be applied to, dispensed onto, printed onto or developed on the substrate 102 as shown in FIG. 6. The microcapsules 50 on the substrate 102 may define a display layer 104 of microcapsules 50 on the substrate 102. The microcapsules 50 may be transferred to the substrate 102 by any application method as known to one skilled in the art.

The display layer 104 on the substrate 102 may form or may define a color density for the microcapsules 50 on the substrate 102. In embodiments, the display layer 104 of the microcapsules 50 may have a thickness of from, for example, about 5 to about 1,000 μm, such as from about 10 to about 500 μm or from about 20 to about 350 μm. In embodiments, the color density formed or defined by the display layer 104 may be continuous, uninterrupted and/or consistent across the substrate 102. In embodiments, the display layer 104 of the microcapsules 50 form a monolayer (a layer having a thickness substantially corresponding to the average diameter of the microcapsules 50 of that display layer 104) in a display layer of the display device. However, multiple display layers 104, for example 2 to about 10 or 2 to about 4, may also be used.

In embodiments, to form a display device that may be capable of displaying multiple colors or full color, more than one display layer 104 may be applied to the substrate 102. For example, each microcapsule 50 of the first layer may define a first subpixel of each pixel for the display device and may contain a set of red electrophoretic particles 10 and a set of white particles. Each microcapsule 50 of a second display layer may contain a set of blue electrophoretic particles 10 and a set of white particles to define a second subpixel for each pixel of the display device. Each microcapsule 50 of a third display layer may contain a set of green electrophoretic particles 10 and a set of white particles to define a third subpixel for each pixel of the display device. Each microcapsule 50 of a fourth display layer may contain a set of black electrophoretic particles 10 and a set of white particles to define a fourth subpixel for each pixel of the display device. Of course, the different color combinations of the microcapsules 50 may all be applied together for simultaneously applying multiple colors.

The microcapsules 50 of the first, second, third and fourth display layers may define the four subpixels for each pixel of the display device. Each subpixel may be capable of displaying a colored electrophoretic particle or a white particle. As a result, each pixel of the display device may be capable of displaying full color, white or multiple colors, such as, red, blue, green and black. The colored electrophoretic particles 10 and white particles in each microcapsule 50 for each subpixel may be controlled to display a color or white to provide full color images.

In embodiments, a single display layer having mierocapsules 50 may be applied onto the substrate 102 to define more than one subpixel for each pixel, such as two subpixels or four subpixels for each pixel of the display device. The microcapsules 50 may be applied onto the substrate 102 to provide desired colored particles in one or more subpixels for each pixel of the display device.

In embodiments, the optional adhesive on the surface 53 of the microcapsules 50 or the substrate 102 may adhere, may retain or may bond the microcapsules 50 or the display layer 104 to the substrate 102. In embodiments, the microcapsule immobilizing agent on the surface of the substrate 102 may adhere, may retain or may bond the microcapsules 50 of the display layer 104 to the substrate 102. Thus, the microcapsule 50 or the display layer 104 may be adhered to, may be retained on or may be bonded to the substrate 102 by the adhesive properties of or the adhesive on the shell 52 of the microcapsules 50 and/or the microcapsule immobilizing agent on the substrate 102.

In embodiments, the color density formed or defined by the display layer 104 may not be continuous, uninterrupted or consistent along the substrate, additional microcapsules 50 may be applied onto the substrate 102. As a result, the display layer 104 formed on the substrate 102 may be continuous, uninterrupted and/or consistent. Any amount of additional microcapsules 50 may be applied onto the substrate 102 until the display layer 104 on the substrate 102 may be continuous, uninterrupted and/or consistent across the substrate 102. Thus, the display layer 104 may be multiple display layers of microcapsules 50 on the substrate 102.

The color density formed by or defined by the display layer 104 that may remain on the substrate 102 may have a resolution of about seventy-five (75) dots per square inch (dpi) or more. The resolution of the display layer 104 on the substrate 102 may depend on, may be based on or may be associated with a size of a diameter of the microcapsules 50 that are applied to the substrate 102. For example, as the size of the diameter of the microcapsules 50 may decrease, the resolution of the display layer 104 may increase on the substrate 102.

Figure 7:
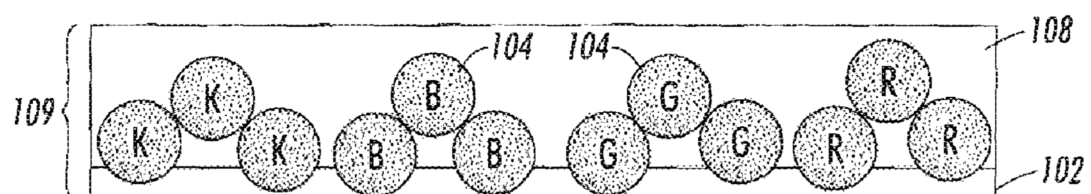

In embodiments, a protective layer 108 may be applied to or dispersed upon the substrate 102 and/or the display layer 104. As a result, the substrate 102, the display layer 104 and/or the protective layer 108 may form or may define a combined structure 109 as illustrated in FIG. 7.

Figure 8:
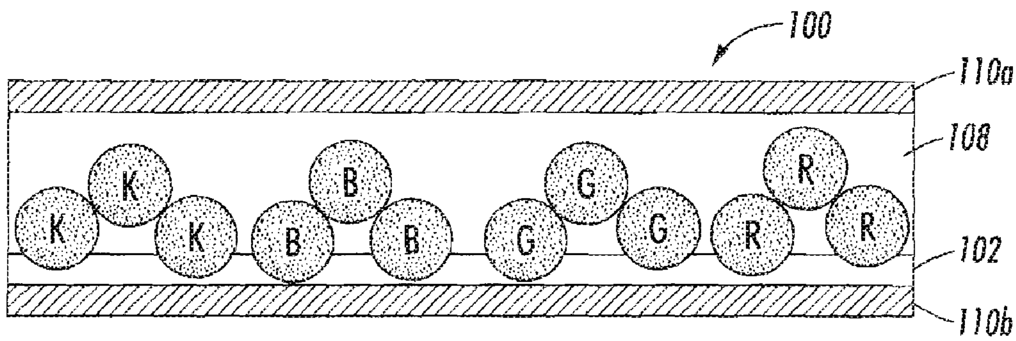

A first or a front conductive substrate 110*a* and/or a second or rear conductive substrate 110*b* (hereinafter "conductive substrates 110*a*, 110*b*") may be applied to the combined structure 109. The combined structure 109 may be located, sandwiched or positioned between the conductive substrates 110*a*, 110*b* as illustrated in FIG. 8. In embodiments, the protective layer 108 may be adjacent to the front conductive substrate 110*a*, and the substrate 102 may be adjacent to the rear conductive substrate 110*b*. The display device 102 may be defined by or may be formed by the combined structure 109 and the conductive substrates 110*a*, 110*b*. Formation of the display device 100 by the combined structure 109 and the conductive substrates 110*a*, 110*b* may have a manufacturing cost that may be lower than a manufacturing cost associated with a conventional display.

The conductive substrates 110*a*, 110*b* may either be flexible or rigid. A top side 58 of the shell 52 for the microcapsules 50 of the display layer 104 may be located adjacent to the front conductive substrates 110*a* as illustrated with FIGS. 3 and 4. As a result, the sets of particles 10, 54 which may be located or positioned adjacent to the top side 58 of the shell 52 for the microcapsules 50 in the display layer 104 may be visible through the front conductive substrate 110*a*.

The conductive substrates 110*a*, 110*b* that sandwich the display layer 104 of the microcapsules 50 therebetween may have a length and width corresponding to the overall length and width of the substrate 102 or the display layer 104. The conductive substrates 110*a*, 110*b* thus may be continuous, unitary films that are not present as just separated pieces over the display layer 104 of the display device, although a plurality of segregated substrates may also be used.

In embodiments, the rear conductive substrate 110*b* may apply the electric field to one or more microcapsules of the display layer 104, for example by transmitting the field as applied by selective electrodes associated with the substrate as discussed above. The electric field may switch or move the sets of particles within the microcapsules 50 of the display layer 104 to display desired particle sets as described above. The electric field may move a desired or an intended electrophoretic particle sets so as to be displayed by the microcapsules 50 via the front substrate 110*a*. The microcapsules 50 of the display layer 104 which may define or form one or more subpixels for each pixel of the display layer 104 on the substrate 102 may be controlled by the electric field to display the desired electrophoretic particles or white particles. By controlling the particles displayed by the subpixels for each pixel of the display layer, the pixels may be controlled by the electric field to form the image via the display layer 104 of the display 100.

In embodiments, a field-effect transistor (not shown in the figures) may be attached to or may be connected to the conductive substrates 110*a*, 110*b* to control a conductivity of the conductive substrates 110*a*, 110*b* or to provide voltage-controlled resistors for the conductive substrates 110*a*, 110*b*. In embodiments, a thin film transistor (not shown in the figures) may be attached to or may be connected to the rear conductive substrate 110*b* to provide a field-effect transistor for the rear conductive substrate 110*b*. The field-effect transistor or the thin film transistor may be applied to the rear conductive substrate 110*b* to apply the electric field to microcapsules 50 of the display layer 104. Alternatively, both of the conductive substrates 110*a*, 110*b* may have one or more transistors on their surface.

The image may be formed by applying the electric field to the microcapsules 50 that define one or more pixels or one or more subpixels for displaying desired particles thereby. The rear conductive substrate 110*b* may apply or may not apply the electric field to each microcapsule 50 defining each pixel or each subpixel for the display device 100. By applying or not applying the electric field to each microcapsule 50 defining each pixel or each subpixel, the rear conductive substrate 110*b* may control positions for each of the sets of particles 10, 54 in the microcapsules 50 as illustrated in FIGS. 3 and 4. As a result, the rear conductive substrate 110*b* may control the microcapsules 50) of the display layer 104 to form an image on the display device 100.

Figure 9:
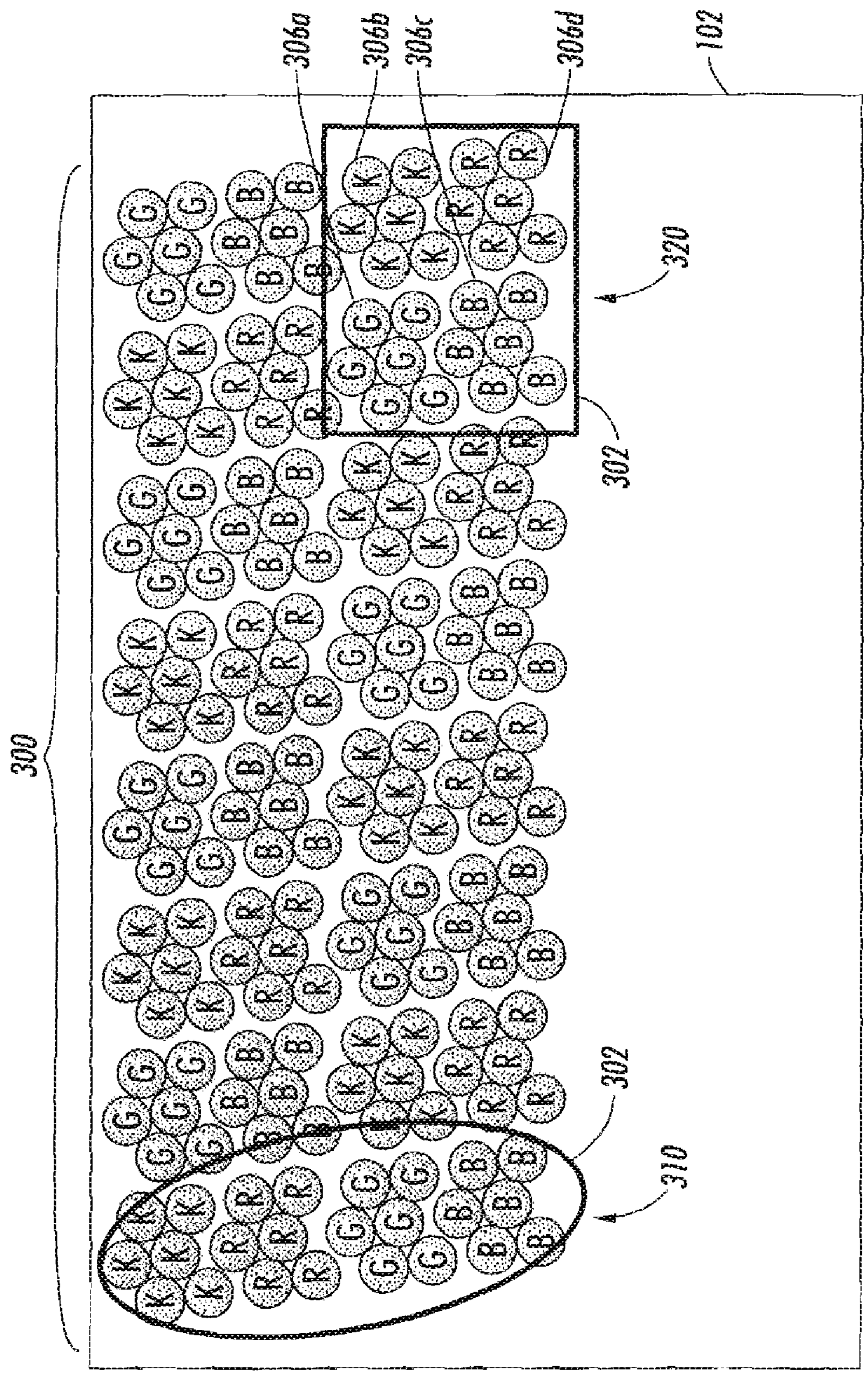
FIGS. 9 and 10 are top planar views of a layout having microcapsules on a substrate in an embodiment of the present disclosure.
Figure 10:
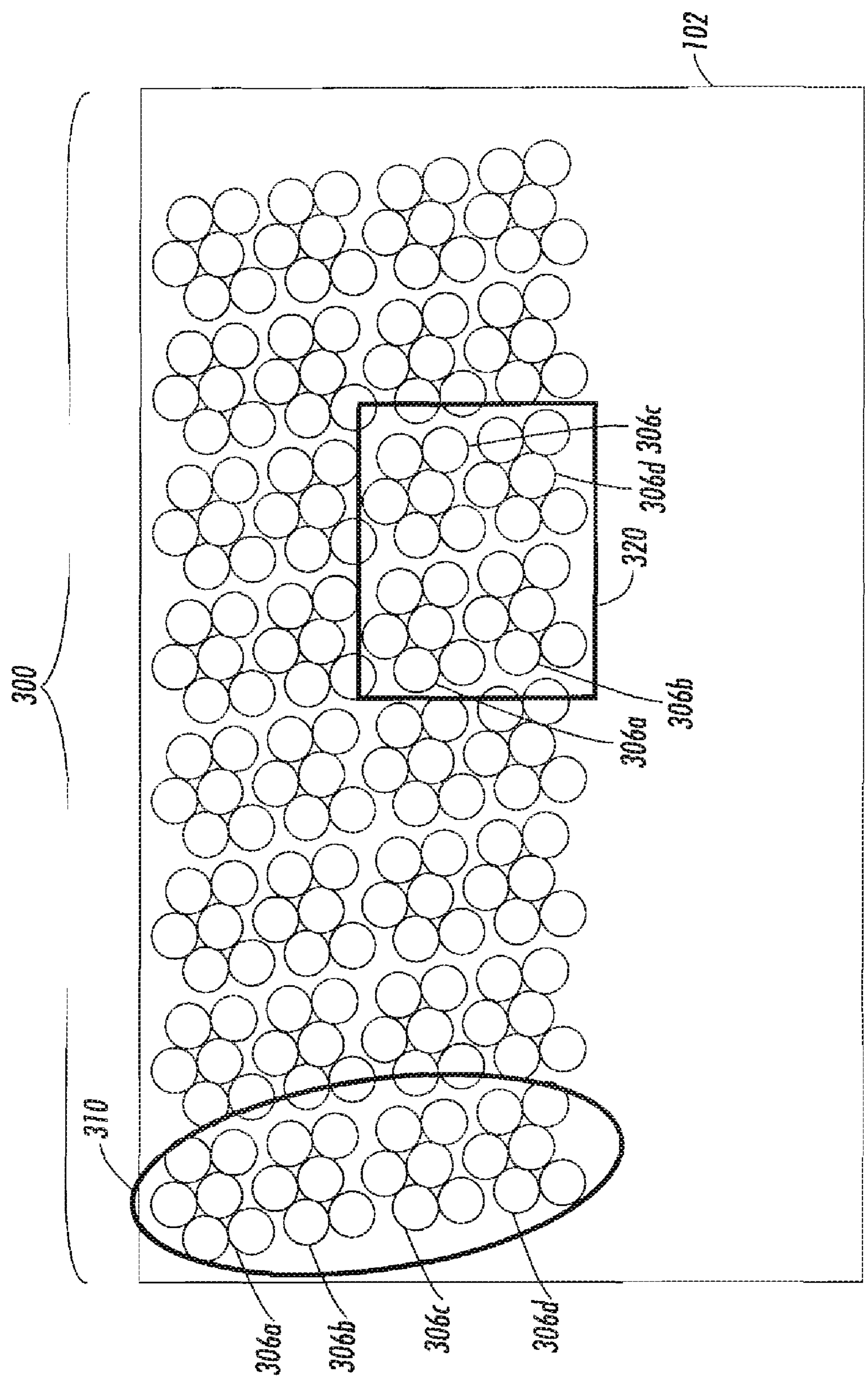

FIGS. 9 and 10 illustrate that the substrate 102 may have a layout 300 including the display layer 104 positioned thereon. The layout 300 may include a multiplicity of microcapsules 50 in the display layer 104 that are positioned or located adjacent to each other defining a pixel 302 of the display layer 104. The layout 300 and/or the display layer 104 may contain any number of pixels 302 that may be required to achieve a desired resolution for the display layer 104 of the display 100. Each of the microcapsules 50 forming the pixel 302 of the display layer 104 may define a subpixel of the pixel 302.

Each pixel 302 on the substrate 102 may be orientated in a first configuration 310 or a second configuration 320 as shown in FIGS. 9 and 10. The first configuration 310 of the pixel 302 may include four (4) microcapsules, such as microcapsules 306*a*-306*d* that may extend vertically or horizontally across the substrate 102. Thus, the pixel 302 may have four different colors exhibited by the four microcapsules. Alternatively, the pixel 302 may have more than or less than four microcapsules. As a result, the pixel 302 may exhibit more than four colors or less than four colors.

The second configuration 320 of the pixel 302 may include the microcapsules 306*a*-306*d* that may be formed in a box-shape or a square-shape. In embodiments, each of the microcapsules 306*a*-306*d* defining each pixel 302 may be a microcapsule having differently colored electrophoretic particles 50 with the core-shell structure and the fluorescent compounds. For example, each pixel 30)$_2$ may include the microcapsule 306*a* that may contain a set of red electrophoretic particles, the microcapsule 306*b* that may contain a set of green electrophoretic particles, the microcapsule 306*c* that may contain a set of blue electrophoretic particles, and the microcapsule 306*d* that may contain a set of black electrophoretic particles. Along with the colored electrophoretic particles, each of the microcapsules 306*a*-306*d* of the layout 300 on the substrate 102 may contain a set of white particles.

In embodiments, each of the microcapsules 306*a*-306*d* for each pixel 302 may contain a first set of colored electrophoretic particles and a second set of differently colored electrophoretic particles. For example, the microcapsule 306*a* may contain a set of red electrophoretic particles and a set of green electrophoretic particles, the microcapsule 306*b* may contain a set of red electrophoretic particles and a set of blue electrophoretic particles, the microcapsule 306*c* may contain a set of blue electrophoretic particles and a set of green electrophoretic particles and the microcapsule 306*d* may contain a set of white electrophoretic particles and a set of black electrophoretic particles. In embodiments, each pixel 302 may be defined by three (3) microcapsules, such as the microcapsules 306*a*-306*c*. For example, the microcapsule 306*a* may contain a set of cyan electrophoretic particles, the microcapsule 306*b* may contain a set of yellow electrophoretic particles, and the microcapsule 306*c* may contain a set of magenta electrophoretic particles.

As described above, the rear conductive substrate 110*b* may apply the electric field to the microcapsules 50 defining each subpixel for each pixel 302, or to each of the capsules 306*a*-306*d* of each pixel 302. The set of colored electrophoretic particles and/or the set of white particles may switch or may move position within the each of the microcapsules 306*a*-306*d* for each pixel 302 depending the electric field and/or the conductivity charge associated with each electrophoretic particle set. As a result, each microcapsule of or each subpixel of each pixel 302 may display the colored particles or the white particles via the microcapsules 306*a*-306*d* and may be in the color mode or a combination of the color mode and the white mode.

Thus, each pixel 302 or each subpixel of each pixel 302 may display a color, such as, blue, green, red, black, white, cyan, yellow, magenta, white or a combined color thereon based on the electrophoretic particles set nearest to the front conductive substrate 110*a*. As a result, each pixel 302 may display an intended color through the front conductive substrate 110*a* via the subpixels of each pixel 302 on the substrate 102 as shown in FIG. 9. As a result, the layout 300 may display a full colored image and/or a black and white image.

In embodiments, the electric-field may change as applied to certain ones of the microcapsules 50 that define each subpixel for each pixel 302 of the layout 300. The electrophoretic particle sets displayed by the selective microcapsules that define one or more of the subpixels thus may switch or move positions based on the change in electric field. In embodiments, microcapsules 306*a*-306*d* for each pixel 302 may display the set of white particles that may be visible through the first electrode layer 110*a* based on the electric field and/or the conductivity charge associated with the particle sets. As a result, the layout 300 on the substrate 102 may display no image or be in white mode as shown in FIG. 10.

In embodiments, the substrate 102 may display a half-toning effect via the microcapsules 306*a*-306*d* defining subpixels of each pixel 302. The half-toning effect may be achieved by applying the electric field to less than all of the microcapsules 306*a*-306*d* for one or more pixels 302 of the layout 300. As a result, a first portion of the microcapsules 306*a*-306*d* for one or more pixels 302 may display colored electrophoretic particles, and the second portion of the microcapsules 306*a*-306*d* for one or more pixels 302 may display white particles based on the electric field and/or the conductivity charge associated with the particle sets. Thus, the half-toning effect may be defined by or formed by one or more pixels 302 that have the first portion of the microcapsules 306*a*-306*d* displaying the sets of the colored electrophoretic particles and the second portion of the microcapsules 306*a*-306*d* displaying the white particles.

The microcapsules 306*a*-306*d* or subpixels for each pixel 302 may have a microcapsule size within a range of about 10 microns to about 150 microns, more preferably in a range of about 20 microns to about 120 microns. In embodiments, the layout 300 on the substrate 102 may have a resolution of about seventy-five (75) dpi, and each pixel 302 of the layout 300 may have a pixel size in a range of about 300 microns to about 360 microns. With a resolution of about seventy-five (75) dpi, the layout 300 on the substrate 102 may have a resolution which may be similar to or substantially similar to a resolution of a computer screen or a monitor.

The rear conductive substrate 110*b* may apply the electric field to any number of the microcapsules 306*a*-306*d* for each pixel 302 of the layout 300. As a result, the layout 300 may display an image at high resolution by displaying colored particles for any number of the microcapsules 306*a*-306*d* of any number of the pixels 302. In embodiments, the image may be displayed by all of the subpixels of each pixel 302 or by all of the pixels 302 by the layout 300.

In embodiments, the orientation or the location of each of the microcapsules 306a-306d allows for developing or for displaying the full colored image at high resolution via the subpixels of the pixels 302. To display the full colored image at high resolution, the microcapsules 306a-306d for each pixel 302 may be required to be orientated in a sequence to display the sets of colored particles within the full colored image at the high resolution. For example, the microcapsules 306a-306d for each pixel 302, in the first configuration 3100, may be required to be in a sequence from the microcapsule 306a at an upper location to the microcapsule 306d at a lower location, with the microcapsules 306b, 306c therebetween as shown in FIGS. 9 and 10. In a second configuration 320 for the pixel 302, the microcapsule 306a may be located in an upper left position, the microcapsule 306b may be located in an upper right position, the microcapsule 306c may be located in a lower left position, and the microcapsule 306d may be located in a lower right position. As a result, each microcapsule 306a-306d or subpixel for each pixel 302 may display a specific set of colored electrophoretic particles to form or to define the image on the layer 300 at high resolution.

The microcapsules 50 may be transferred to or applied onto the substrate 102 to form pixels 302 in the first configuration 310 or the second configuration 320. Each of the microcapsules 306a-306d may be positioned or located at the proper orientation to achieve the first configuration 310 or the second configuration 320. Moreover, the microcapsules 306a-306b may be positioned or located at any desired orientation to form any configuration as known to one skilled in the art.

By applying the electric field to one or more microcapsules 306a-306d defining the subpixels for each pixel 302, the rear conductive substrate 111b may control whether each subpixel or pixel 302 on the substrate 102 displays colored electrophoretic particles or white particles. As a result, the rear conductive substrate 110b may control the subpixels and/or the pixels 302 on the substrate 102 to form or to display the image or a series of images on the substrate 102 at high resolution. Moreover, the rear conductive substrate 110b may change or reverse the electric field to move or switch particles sets displayed by the subpixels and/or the pixels 302 to produce a series of images sequentially or simultaneously and/or to produce an animation or the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An electrophoretic ink comprising:

either (a) at least two sets of differently colored particles in a substantially clear fluid, or (b) at least one set of colored particles in a fluid that is of a different color than the at least one set of colored particles, wherein at least one set of colored particles comprises particles having a core-shell structure comprising:

a shell; and a core located within the shell, wherein the core comprises a colorant, a resin binder and a fluorescent compound, the at least one set of colored particles having the core-shell structure is movable within the fluid by an electric field, and the resin binder binds the colorant and the fluorescent compound within the core.

2. The electrophoretic ink according to claim 1, wherein the shell of the at least one electrophoretic particle is comprised of a polymer material that is substantially transparent.

3. The electrophoretic ink according to claim 1, wherein the fluorescent compound is about 0.05% to about 10% of a total weight of the electrophoretic particle.

4. The electrophoretic ink according to claim 1, wherein the (a) at least two sets of differently colored particles include one of either red/white, blue/white, green/white, red/green, blue/green and red/blue particle combinations.

5. The electrophoretic ink according to claim 1, wherein the fluorescent compound includes one or more of 4,4'-bis (styryl)biphenyl, 2-(4-phenylstilben-4-yl)-6-t-butylbenzoxazole, β-methylumbelliferone, 4-methyl-7-dimethylaminocoumarin, 4-methyl-7-aminocoumarin, N-methyl-4-methoxy-1,8-naphthalimide, 9,10-bis(phenethynyl) anthracene, or 5,12-bis(phenethynyl)naphthacene.

6. The electrophoretic ink according to claim 1, wherein each set of colored particles comprises core-shell particles having a fluorescent compound.

7. The electrophoretic ink according to claim 1, wherein the fluorescent compound emits light at a wavelength substantially similar to a wavelength of light emitted by the colorant.

8. An electrophoretic display device comprising the fluorescent electrophoretic ink according to claim 1.

9. An electrophoretic display device comprising:

a display layer comprised of reservoirs, wherein a multiplicity of the reservoirs are filled with an electrophoretic ink comprising either (a) at least two sets of differently colored particles in a substantially clear fluid, or (b) at least one set of colored particles in a fluid that is of a different color than the at least one set of colored particles, wherein at least one set of colored particles comprises particles having a core-shell structure that includes a core comprising a fluorescent compound, a resin binder and a colorant, the at least one set of colored particles having the core-shell structure are movable in the fluid within the reservoir by an electric field, and the resin binder binds the colorant and the fluorescent compound within the core.

10. The electrophoretic display device according to claim 9, further comprising:

at least one conductive substrate positioned adjacent to the display layer, wherein the at least one conductive substrate applies the electric field to the reservoirs of the display layer.

11. The electrophoretic display device according to claim 9, wherein the reservoirs of the display layer are microcapsules encapsulating the electrophoretic ink.

12. The electrophoretic display device according to claim 9, wherein at least two of the reservoirs of the display layer define a pixel of the display device, wherein one of the at least two microcapsules is adjacently positioned to another of the at least two microcapsules.

13. The electrophoretic display device according to claim 12, wherein the pixel of the display device includes at least three different inks each having two differently colored particle sets, wherein each set of the at least three different two particle sets is within a different reservoir of the display layer, wherein the at least three different two particle sets including either red/white, blue/white and green/white microcapsule combinations or red/green, blue/green and red/blue two particle combinations.

14. The electrophoretic display device according to claim 13, further comprising:

two conductive substrates, wherein the display layer is located between the two conductive substrates, at least a viewing side one of which is transparent, wherein at least one of the conductive substrates applies the electric field to at least one reservoir of the display layer.

15. The electrophoretic display device according to claim 9, wherein the fluorescent compound includes one or more of 4,4'-bis(styryl)biphenyl, 2-(4-phenylstilben-4-yl)-6-t-butylbenzoxazole, β-methylumbelliferone, 4-methyl-7-dimethylaminocoumarin, 4-methyl-7-aminocoumarin, N-methyl-4-methoxy-1,8-naphthalimide, 9,10-bis(phenethynyl) anthracene, or 5,12-bis(phenethynyl)naphthacene.

16. The electrophoretic display device according to claim 9, wherein the fluorescent compound is about 0.05% to about 10% of a total weight of the electrophoretic particle.

17. A method of displaying images, the method comprising, in a display device having a display layer including at least two reservoirs, wherein the at least two reservoirs are filled with an electrophoretic ink that is comprised either (a) at least two sets of differently colored particles in a substantially clear fluid, or (b) at least one set of colored particles in a fluid that is of a different color than the at least one set of colored particles, wherein at least one set of colored particles includes at least one electrophoretic particle having a core-shell structure that includes a fluorescent compound, a resin binder and a colorant within the core of the electrophoretic particle, applying an electric field to selected ones of the reservoirs so as to move a desired set of particles therein to be viewed by a viewer, wherein individual reservoirs are thus made to display a desired color and form an image in the display layer.

18. The method according to claim 17, further comprising:

positioning the display layer between two conductive substrates, at least a viewing side one of which is transparent, wherein the electric field is applied to the reservoirs of the display layer by one of the conductive substrates.

19. The method according to claim 17, wherein the reservoirs of the display layer are microcapsules with the electrophoretic ink encapsulated therein.

20. The method according to claim 17, further comprising:

forming a pixel of an image with at least two reservoirs of the display layer, wherein one of the at least two reservoirs is adjacently positioned to another of the at least two reservoirs.

21. The method according to claim 20, wherein the pixel includes at least three different two particle set microcapsules, including either red/white, blue/white and green/white microcapsule combinations or red/green, blue/green and red/blue microcapsule combinations.

22. The method according to claim 17, wherein the fluorescent compound is about 0.05% to about 10% of a total weight of the electrophoretic particle.

23. The method according to claim 17, wherein the at least two sets of differently colored particles include one of either red/white, blue/white, green/white, red/green, blue/green and red/blue particle combinations.

24. The method according to claim 17, wherein the fluorescent compound includes one or more of 4,4'-bis(styryl) biphenyl, 2-(4-phenylstilben-4-yl)-6-t-butylbenzoxazole, β-methylumbelliferone, 4-methyl-7-dimethylaminocoumarin, 4-methyl-7-aminocoumarin, N-methyl-4-methoxy-1,8-naphthalimide, 9,10-bis(phenethynyl)anthracene, or 5,12-bis(phenethynyl)naphthacene.

* * * * *